United States Patent
Jarquin Arroyo et al.

(10) Patent No.: US 12,347,169 B2
(45) Date of Patent: Jul. 1, 2025

(54) AUTONOMOUS VEHICLE PERCEPTION MULTIMODAL SENSOR DATA MANAGEMENT

(71) Applicant: Intel Corporation, Santa Clara, CA (US)

(72) Inventors: Julio Fernando Jarquin Arroyo, Baden-Wuerttemberg (DE); Ignacio J. Alvarez, Portland, OR (US); Cornelius Buerkle, Karlsruhe (DE); Fabian Oboril, Karlsruhe (DE)

(73) Assignee: Intel Corporation, Santa Clara, CA (US)

( * ) Notice: Subject to any disclaimer, the term of this patent is extended or adjusted under 35 U.S.C. 154(b) by 679 days.

(21) Appl. No.: 17/559,422

(22) Filed: Dec. 22, 2021

(65) Prior Publication Data
US 2022/0114805 A1 Apr. 14, 2022

(51) Int. Cl.
*G06V 10/774* (2022.01)
*G06N 3/08* (2023.01)
(Continued)

(52) U.S. Cl.
CPC ............ *G06V 10/774* (2022.01); *G06N 3/08* (2013.01); *G06V 10/32* (2022.01); *G06V 10/803* (2022.01);
(Continued)

(58) Field of Classification Search
CPC .... G06V 10/774; G06V 10/32; G06V 10/803; G06V 20/56; G06N 3/08; G06N 3/084;
(Continued)

(56) References Cited

U.S. PATENT DOCUMENTS 10,169,680 B1 * 1/2019 Sachdeva ............ G06F 3/04842
11,422,546 B2 * 8/2022 Giering ................. G06F 18/251
(Continued)

OTHER PUBLICATIONS

Halder, S S, "Physics-based rendering for improving robustness to rain", In Proceedings of the IEEE CVF International Conference on Computer Vision, (2019), pp. 10203-10212.
(Continued)

*Primary Examiner* — Charlotte M Baker
(74) *Attorney, Agent, or Firm* — Schwegman Lundberg & Woessner, P.A.

(57) ABSTRACT

The automated driving perception systems described herein provide technical solutions for technical problems facing navigation sensors for autonomous vehicle navigation. These systems may be used to combine inputs from multiple navigation sensors to provide a multimodal perception system. These multimodal perception systems may augment raw data within a development framework to improve performance of object detection, classification, tracking, and sensor fusion under varying external conditions, such as adverse weather and light, as well as possible sensor errors or malfunctions like miss-calibration, noise, and dirty or faulty sensors. This augmentation may include injection of noise, occlusions, and misalignments from raw sensor data, and may include ground-truth labeling to match the augmented data. This augmentation provides improved robustness of the trained perception algorithms against calibration, noise, occlusion, and faults that may exist in real-world scenarios.

25 Claims, 12 Drawing Sheets

(51) Int. Cl.
*G06V 10/32* (2022.01)
*G06V 10/80* (2022.01)
*B60W 60/00* (2020.01)

(52) U.S. Cl.
CPC ..... *B60W 60/001* (2020.02); *B60W 2420/403* (2013.01); *B60W 2420/408* (2024.01); *B60W 2555/20* (2020.02)

(58) Field of Classification Search
CPC ....... G06N 3/04; G06N 20/00; B60W 60/001; B60W 2420/403; B60W 2420/408; B60W 2555/20
USPC .......................................................... 382/104
See application file for complete search history.

(56) References Cited

U.S. PATENT DOCUMENTS

| | | | |
|---|---|---|---|
| 11,887,475 B1* | 1/2024 | Riggs | G08G 1/09623 |
| 2023/0031124 A1* | 2/2023 | Alkhateeb | G06N 3/0499 |

OTHER PUBLICATIONS

Kothandaraman, D, "SS-SFDA: Self-supervised source-free domain adaptation for road segmentation in hazardous environments", In Proceedings of the IEEE CVF International Conference on Computer Vision, (2021), pp. 3049-3059.

Zhai, L, "It's Raining Cats or Dogs? Adversarial Rain Attack on DNN Perception", arXiv preprint arXiv:2009.09205, (2020), 29 pgs.

\* cited by examiner

AUTONOMOUS VEHICLE PERCEPTION MULTIMODAL SENSOR DATA MANAGEMENT

TECHNICAL FIELD

Embodiments described herein generally relate to autonomous vehicle sensors and sensor data processing.

BACKGROUND

Autonomous vehicles may be used to provide transportation without requiring full driver (e.g., operator) control. Fully autonomous vehicles may be used to navigate to a destination without any driver input while avoiding pedestrians, other vehicles, and other obstacles. Partially autonomous vehicles may receive a control input from a driver and may modify the vehicle control (e.g., steering, braking) to augment the navigation to a destination. These autonomous vehicles may identify and avoid obstacles using one or more input navigation sensors, such as an image capture device (e.g., camera), Light Detection and Ranging System (LiDAR), and RADAR. However, these navigation sensors are often subject to degraded performance under varying external conditions (e.g., adverse weather, varying light conditions) or under sensor errors or malfunctions (e.g., miss-calibration, noise, dirty sensors, faulty sensors).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The automated driving perception systems described herein provide technical solutions for technical problems facing navigation sensors for autonomous vehicle navigation. These systems may be used to improve the performance of individual navigation sensors, and may be used to combine inputs from multiple navigation sensors to provide a multimodal perception system. In an example, image capture devices (e.g., cameras) may be used to generate an image dataset, and ranging devices (e.g., LiDAR, RADAR) may be used to generate a ranging dataset (e.g., point cloud dataset). These multimodal perception systems may make use of overlapping fields of view when placing sensors instrumentation to provide independent inputs in every surrounding region, which may be used to provide omnidirectional detection of vehicles and other objects around the vehicle.

These multimodal perception systems may work to improve or guarantee complete environmental sensing and robust perception performance under varying external conditions, such as adverse weather and light, as well as possible sensor errors or malfunctions like miss-calibration, noise, and dirty or faulty sensors. This difference between performance under ideal conditions and performance under adverse weather or sensor conditions may be referred to as a domain gap. To improve perception system tasks of localization, object detection, object classification, and sensor fusion (e.g., combining various navigation sensors), the multimodal perception systems described herein are designed to identify and minimize or eliminate perception degradation due to these external conditions or sensor errors.

In an example, these multimodal perception systems may improve performance of object detection, classification, tracking, and sensor fusion by augmenting raw data (e.g., datasets) within a development framework. This augmentation may include injection of noise, occlusions, and misalignments from raw sensor data, and may include ground-truth labeling to match the augmented data. This augmentation provides improved robustness of the trained perception algorithms against calibration, noise, occlusion, and faults that may exist in real-world scenarios. When using these multimodal perception systems within a development framework, designers of automated driving perception systems may programmatically inject sensor errors during a machine learning training phase. Training perception models based on the datasets with injected errors may be used to improve the ability of data-driven machine learning solutions to operate (e.g., correctly identify objects) in the presence of adverse conditions that are likely to occur.

In the following description, for purposes of explanation, numerous specific details are set forth to provide a thorough understanding of some example embodiments. It will be evident, however, to one skilled in the art that the present disclosure may be practiced without these specific details.

Figure 1:
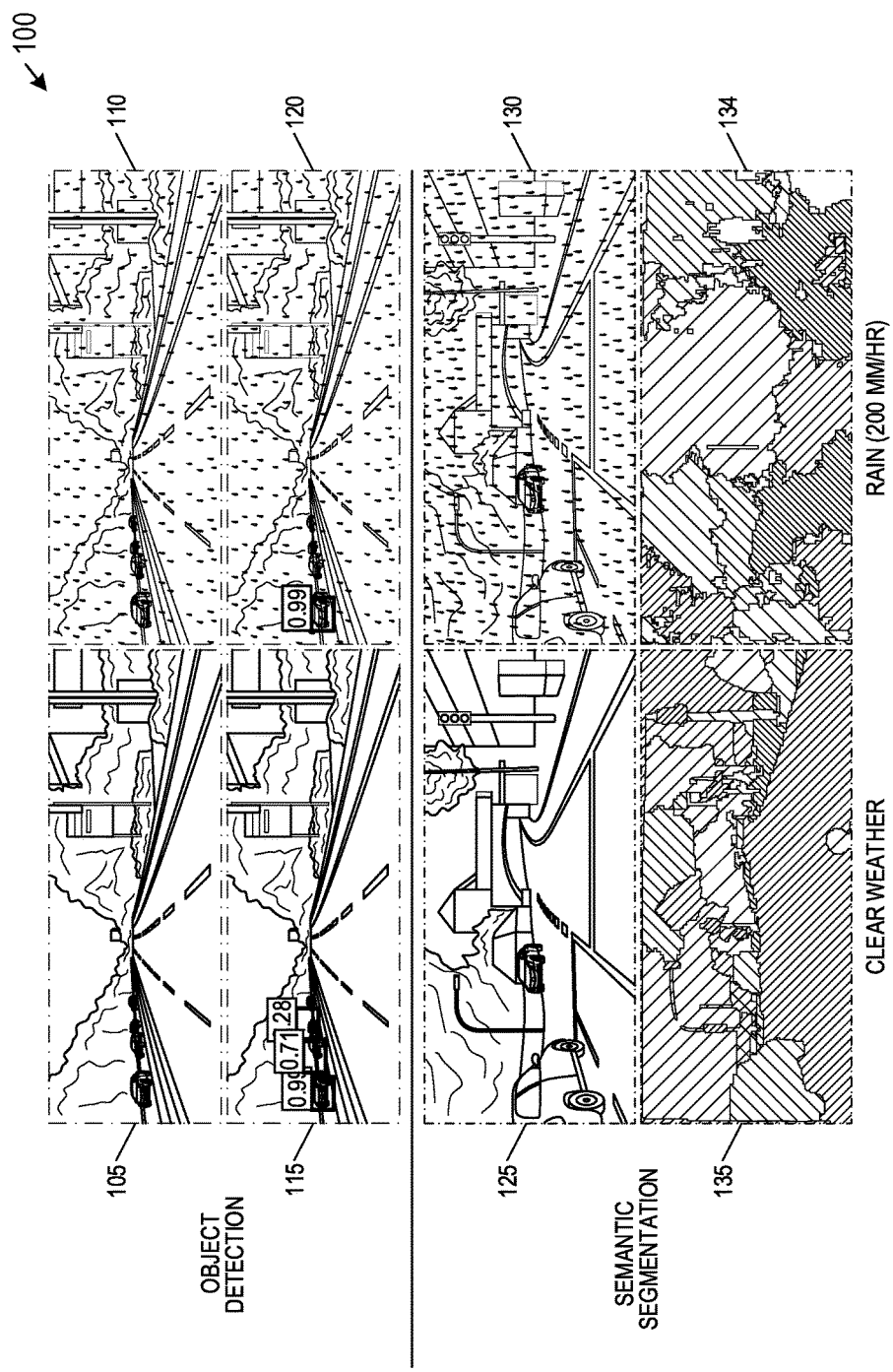
FIG. 1 is a pictorial drawing illustrating a multimodal perception system output, according to an embodiment.

FIG. 1 is a pictorial drawing illustrating a multimodal perception system output 100, according to an embodiment. Images 105 through 120 illustrate the effect of artificially induced rain on object detection. Typically rain or other weather effects are introduced during inclement weather, though weather conditions may also be introduced through a navigation system attack (e.g., navigation cyberattack). A clear input object detection image 105 may include one or more vehicles, which may be identified by bounding boxes as shown in clear output object detection image 115. The clear input object detection image 105 may be modified to include synthetically generated physics-based rain drops, as shown in rainy input object detection image 110. The artificially induced rain may reduce the performance of object detection, as can be seen in the reduced number of vehicles identified in rainy output object detection image 120.

Images 125 through 140 illustrate the effect of artificially induced rain on semantic segmentation. A clear input semantic segmentation image 125 may include one or more vehicles, road areas, foliage areas, and other object areas, which may be identified by patterns, colors, or other region indications as shown in clear output semantic segmentation image 135. The clear input semantic segmentation image 125 may be modified to include synthetically generated physics-based rain drops, as shown in rainy input semantic segmentation image 130. The artificially induced rain may reduce the performance of semantic segmentation, as can be seen in the differences between the regions in the clear output semantic segmentation image 135 and the rainy output semantic segmentation image 140. The present multimodal perception systems may be used to train and validate perception models to improve the performance of the perception models under adverse weather conditions, such as shown in FIG. 2.

Figure 2:
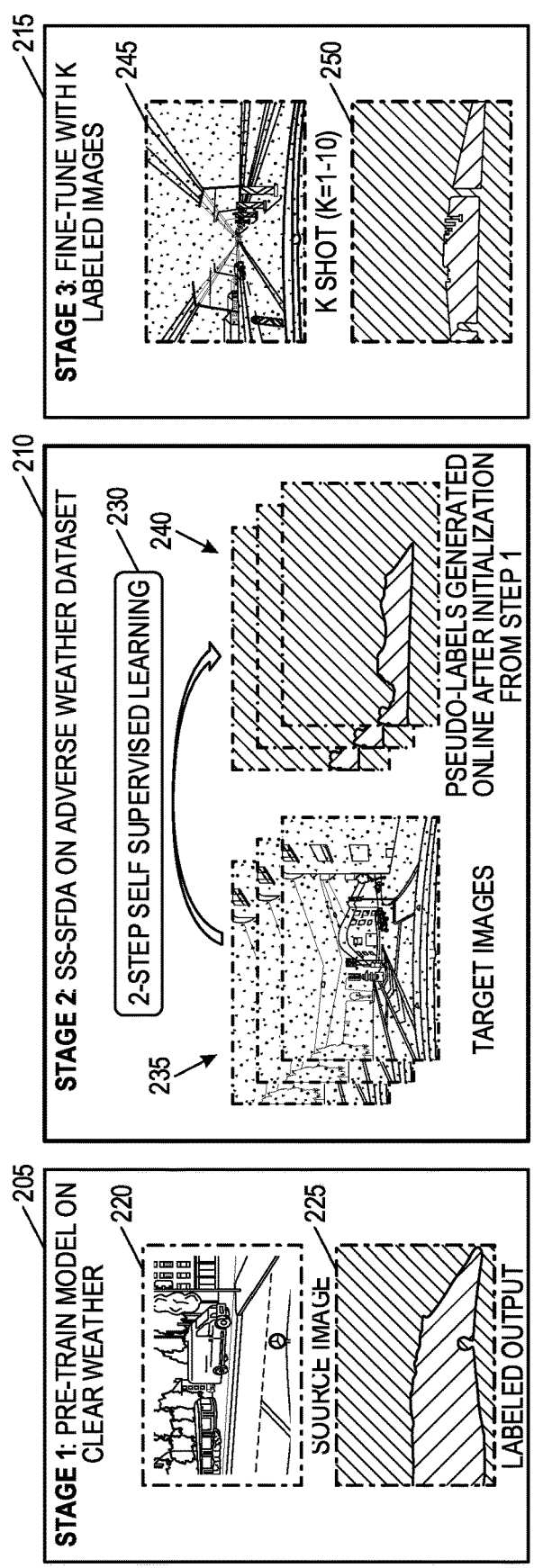
FIG. 2 is a block diagram illustrating a multistage perception system training, according to an embodiment.

FIG. 2 is a block diagram illustrating a multistage perception system training 200, according to an embodiment. Training 200 may include application of two or more adverse weather conditions in a multistage self-supervised machine learning environment. Training 200 may include a first stage 205, which pre-trains a machine learning model on an automated driving perception system dataset that includes clear weather. In an example, for each source image 220 in the dataset, the first stage 205 may generate a segmented and labeled output 225. Training 200 may include a second stage 210, which may include training on a dataset with artificially induced adverse weather. The second stage 210 may include two-step self-supervised learning 230, such as self-supervised source-free domain adaptation supervised learning. This two-step self-supervised learning 230 may include receiving target images 235 with artificially induced adverse weather, then using target images 235 to generate pseudo-label images 240 generated after initialization within the first stage 205. Training 200 may include a third stage 215, which may include fine-tuning the labeled images with K labeled images to receive fine-tuning input image 245 to generate fine-tuning labeled image 250. Training 200 may apply this two-step self-supervised learning on a pretrained good-weather model to improve automatic label generation.

Figure 3:
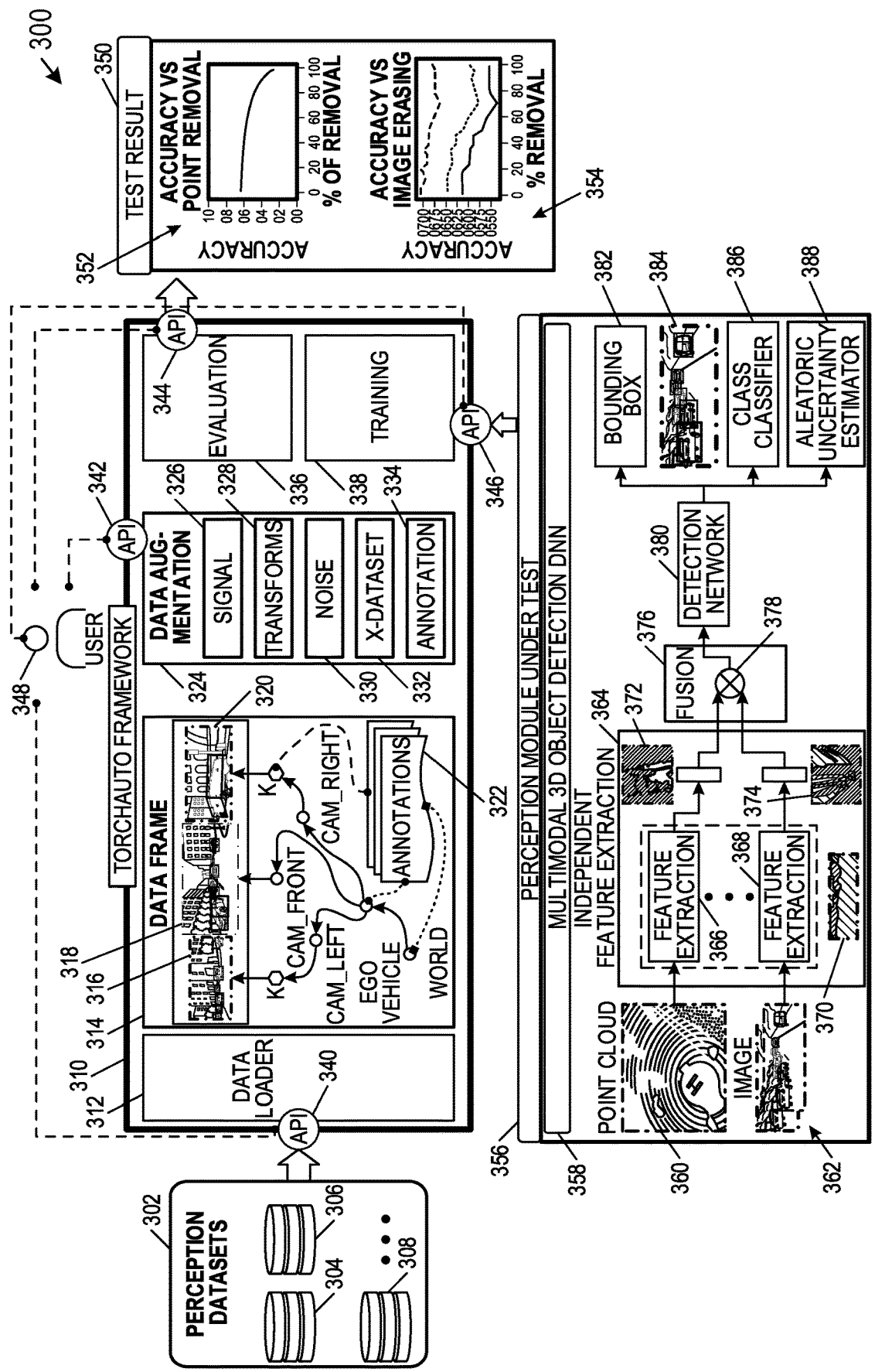
FIG. 3 is a block diagram illustrating a multistage perception system environment, according to an embodiment.

FIG. 3 is a block diagram illustrating a multistage perception system environment 300, according to an embodiment. Environment 300 provides an overview of the data manipulation and obfuscation modules that may be used within the present multimodal perception system. Environment 300 may include a multistage perception system framework 310. The framework 310 may receive one or more perception datasets 302 via a data loader 312, which may be accessible via a dataset application programming interface (API) 340. Each data frame 314 may include one or more input images, such as images from multiple cameras in various locations on a vehicle. Framework 310 may include data augmentation 324, which may include one or more of a signal augmentation 326, a transform augmentation 328, a noise augmentation 330, a cross-dataset augmentation 332, and an annotation augmentation 334. The data augmentation 324 is described in greater detail below with respect to FIGS. 4A-11.

Environment 300 may include a perception module under test 356. This perception module under test 356 may be used by framework 310 to provide training 338, and may be accessible via a training API 346. This perception module under test 356 may include a multimodal 3D object detection machine learning network 358. In an example, the multimodal 3D object detection machine learning network 358 may be implemented as an artificial neural network (ANN), and more specifically may be implemented as a deep neural network (DNN) with multiple layers between the input and output image layers. Network 358 may receive one or more point cloud inputs 360, such as point clouds (e.g., ranging dataset) generated by a LiDAR or RADAR sensor, and may receive one or more corresponding input images 362 that correspond to each of the point cloud inputs 360. Independent feature extraction 364 may be used to apply a point cloud feature extraction 366 to each of the point cloud inputs 360 to generate an extracted point cloud feature output 372, and similarly apply an image feature extraction 368 to each of the image inputs 362 to generate an extracted image feature output 374. Sensor fusion 376 may receive and combine both the extracted point cloud feature output 372 and the extracted image feature output 374 to improve or maximize fault tolerance. A detection network 380 may receive combined data from the sensor fusion 376 and detect various objects or other features, which may be used to generate one or more of a bounding box output 382, an image output 384, a class classifier output 386, or an aleatoric uncertainty (e.g., statistical uncertainty) estimator output 388.

Environment 300 may include a test result output 350. This test result output 350 may be used by framework 310 to provide evaluation 336, and may be accessible via an evaluation API 344. Test result 350 may generate various raw data or data plots to analyze the training or model performance, such as accuracy as a function of point removal 352 or accuracy as a function of image erasing 354.

In an example, a user 348 may access various features within environment 300 using various APIs, such as dataset API 340, framework API 342, evaluation API 344, or training API 346. The user 348 may use these APIs to implement or test various features within this multistage perception system, such as application of data augmentation or data obfuscation via error injection and transformation used during model training tasks, which may be used to train perception models. These APIs also provide access to metrics for evaluation of the robustness under the programmatic fault injection methods, which may be used to validate the performance of perception models.

FIGS. 4A-4D are pictorial drawings illustrating sensor signal augmentation, according to an embodiment. To interface one or more datasets with a training framework of a selected perception model, a user may specify how the dataset input is to be converted to match an input type and shape expected by the neural network architecture of the selected perception model. Various datasets may contain sensor data in various formats, and input signal modifications may be used to modify the input dataset to match the input type and shape of the target perception model. In addition, modifications to the input dataset may be accompanied by corresponding updates to the ground-truth annotations of the dataset to ensure the annotations are equally transformed into the expected targets of the perception model.

Figure 4A:
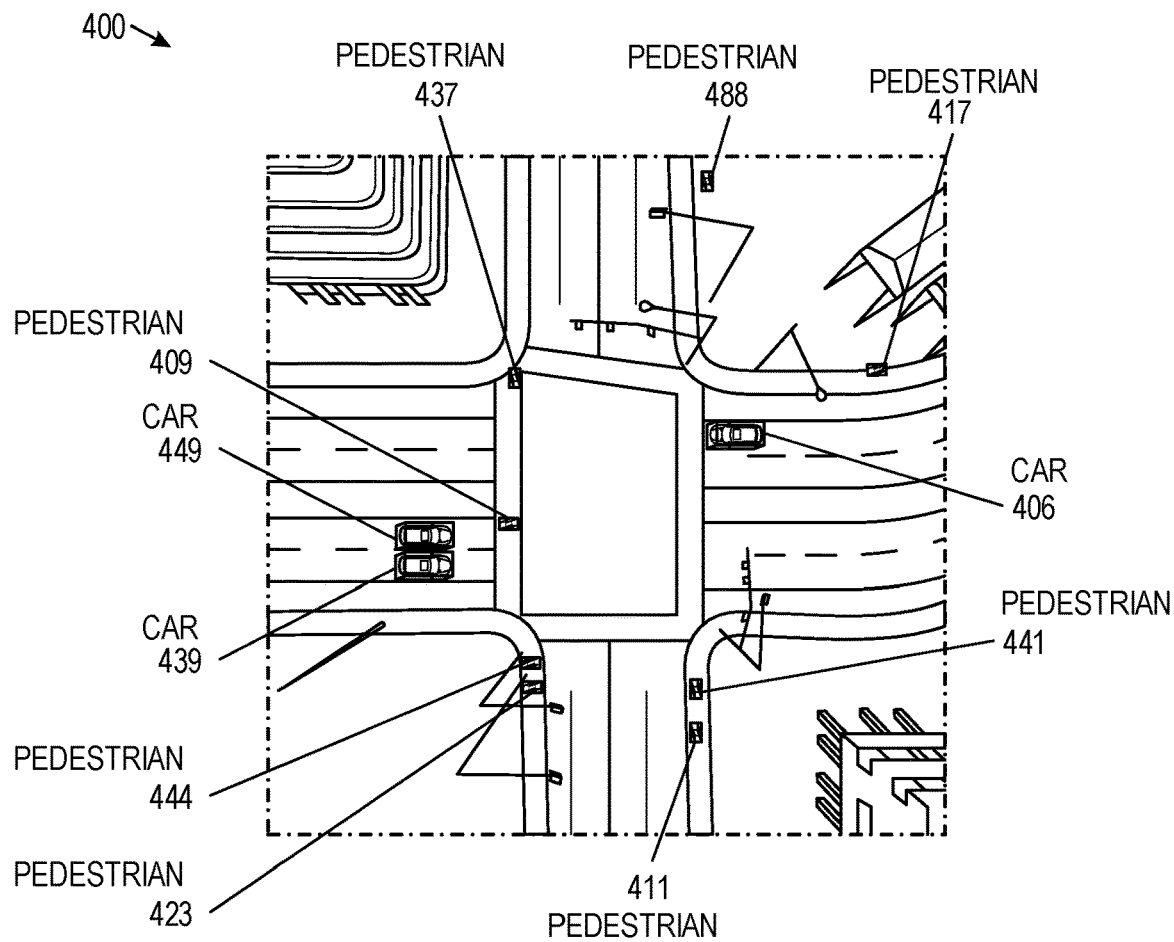
FIGS. 4A-4D are pictorial drawings illustrating sensor signal augmentation, according to an embodiment.
Figure 4B:
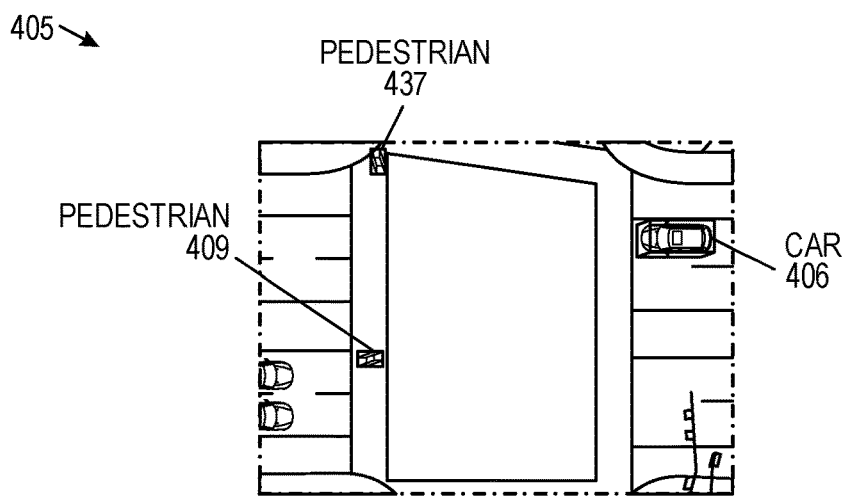

Augmentation 400 may include an augmentor transformation. The augmentor transformation may produce an output object (e.g., output image) with augmented characteristics, such as resizing an image, reducing a field of view of a LiDAR point cloud, adding transformations to a transform tree, or adding noise to an image or LiDAR point cloud. As shown in FIGS. 4A-4D, augmentation may include one or more annotated image operations, such a resizing, cropping, or other operations. FIG. 4A shows an annotated input intersection image 400, which may include pedestrians 437, 488, 417, 441, 411, 423, 444, 409 and one or more cars 406, 439, 449. In an example, annotated input intersection image 400 represents a dataset generated by multiple navigation sensors that have been combined and converted into a 2D top view image of an intersection. In an example, this annotated input intersection image 400 may include an annotated image of a first size (e.g., 1600×1600 pixels), and it may need to be converted to a target size of a second, smaller size (e.g., 800×600 pixels) for use in a target detection neural network architecture. FIG. 4B shows an example cropped image 405, which shows an example cropping (not necessarily to scale) from the 1600×1600 pixels of the annotated input intersection image 400 down to the target size of 800×600 pixels. As can be seen in FIG. 4B, information outside of the specified target dimension may be lost when only using this cropping function.

Figure 4C:
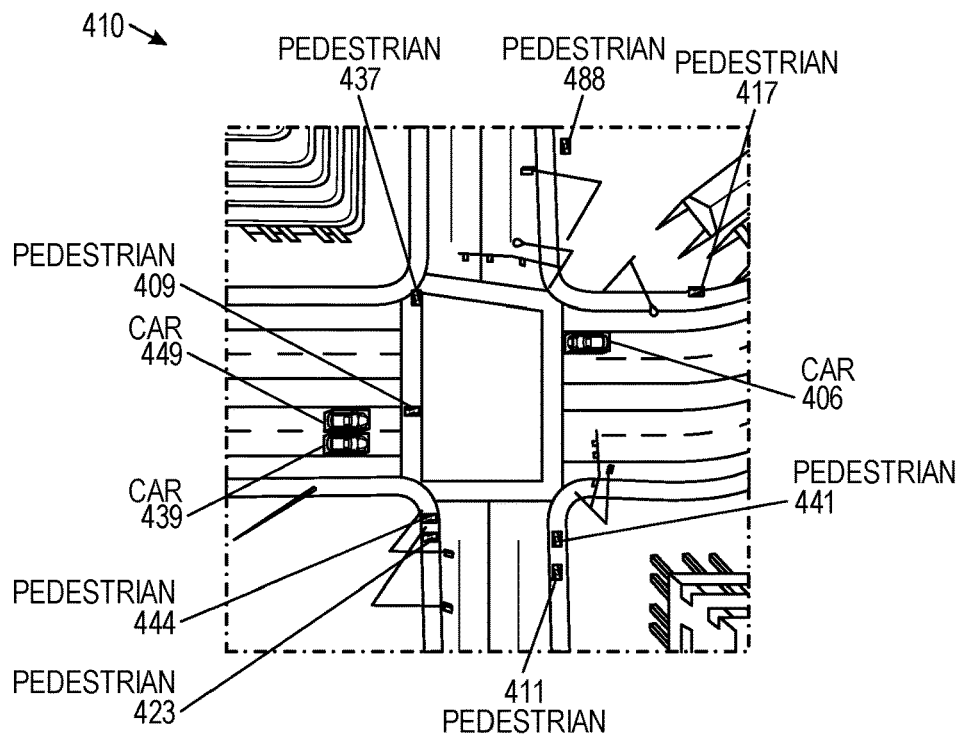
Figure 4D:
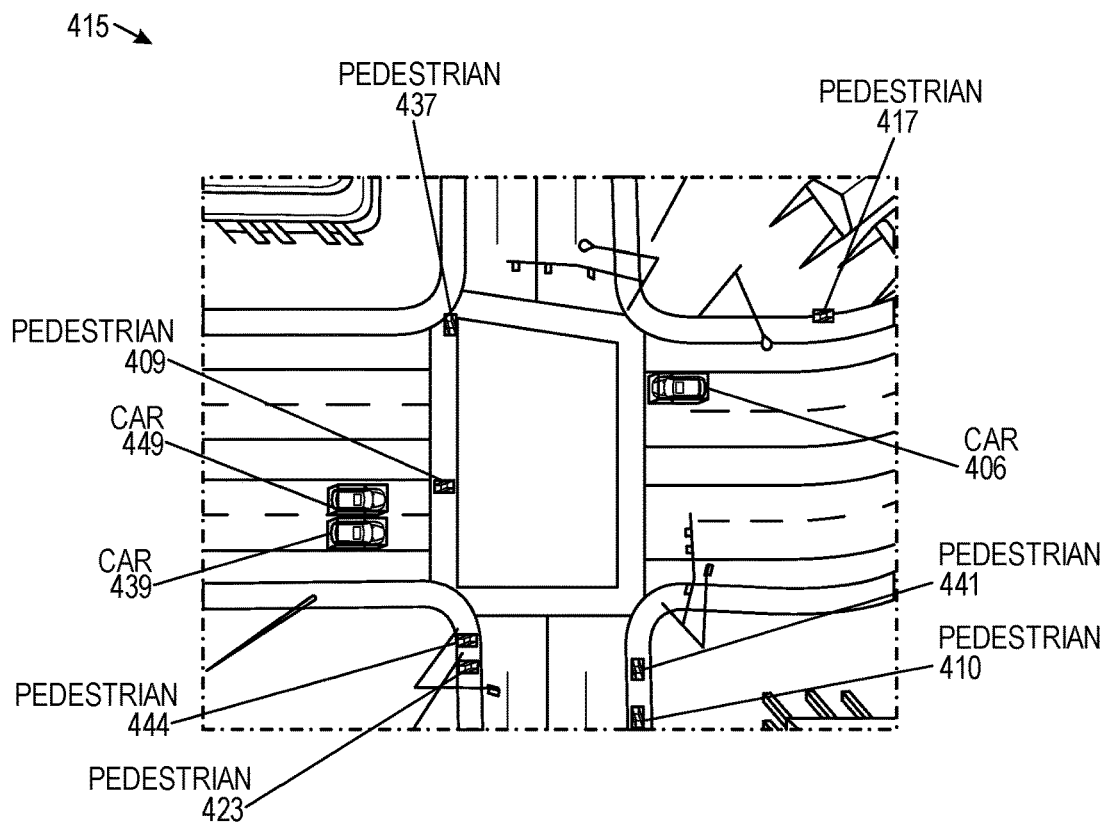

FIG. 4C shows an example resized image 410, which shows an example resizing (not necessarily to scale) of the 1600×1600 pixels of the annotated input intersection image 400 down to the target size of 800×600 pixels. As can be seen in comparing FIG. 4A and FIG. 4C, this resize operation may result in some distortions of objects in the original image. FIG. 4D shows an example resized image 415, which shows an example cropping and resizing (not necessarily to scale) of the 1600×1600 pixels of the annotated input intersection image 400 down to the target size of 800×600 pixels. This cropping and resizing may include expanding the cropping frame in the target size ratio (e.g., 4:3 ratio cropping frame) to the widest extent, cropping pixels outside of this region, and then resizing the resulting image down to the target size of 800×600 pixels. The use of the combined cropping and resizing operation may improve or maximize the amount of captured information when converting a dataset into a target size dataset.

Additional dataset augmentation may be used to support a conversion of an input dataset to conform to the input requirements of a target neural network architecture. A dataset transformer may be used to define a mapping from an input dataframe to input tensors of the target neural network. In an example, the dataset transformer may return channel data for each input dataframe into a specified format for the target neural network, such as a NumPy array, a PyTorch tensor, or other format. A dataset target generator may be used to define a mapping from an input dataframe to learning targets of the target neural network. In an example, for 3D object detection models, the dataset target generator may return a list with data values (e.g., x, y, z, length, width, height, yaw) of the annotations in the input dataframe. Similarly, for 2D object detection models, the dataset target generator may return a list with data values of corresponding bounding boxes visible on an input image (e.g., x, y, width, height). The dataset target generator may also include a target generator threshold to update labels to the format of the target neural network, which provides the ability to train the dataset using the updated labels that map to the desired input format of the target neural network.

Figure 5:
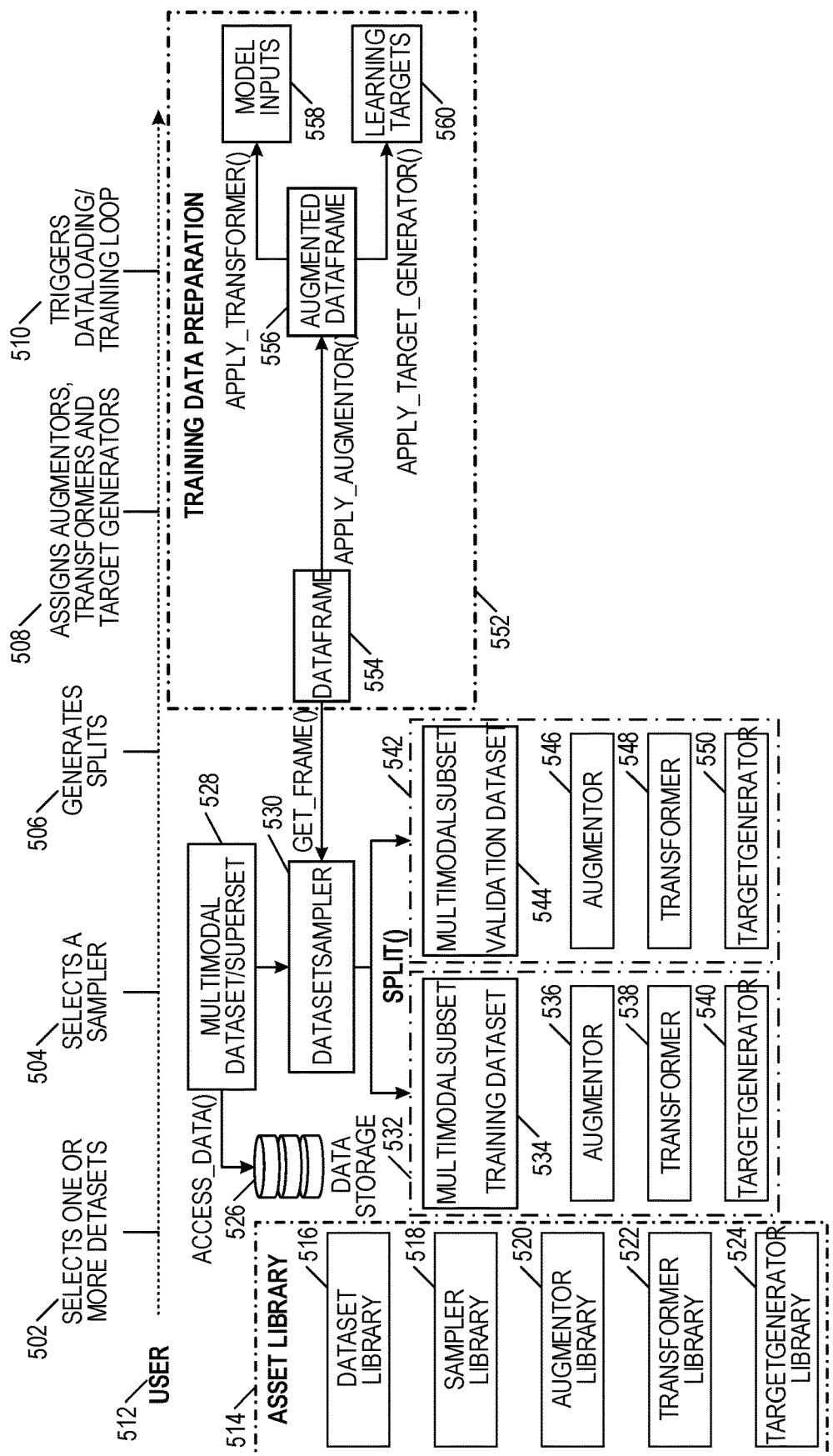
FIG. 5 is a block diagram illustrating data preparation, according to an embodiment.

FIG. 5 is a block diagram illustrating data preparation 500, according to an embodiment. Data preparation 500 may be used to select and prepare a dataset for a target neural network. In an example, a user 512 may select one or more datasets 502, select a sampler 504, generate dataset splits 506, assign augmentors, transformers, and target generators 508, and trigger data loading or a training loop 510. The augmentors may include one or more of the augmentor transformation, dataset transformer, and dataset target generator described above. The user may select one or more of these assets from an asset library 514, which may include a dataset library 516, a sampler library 518, an augmentor library 520, a transformer library 522, and a target generator library 524.

To prepare a dataset for training and validation, one or more datasets may be retrieved from data storage 526 to generate a multimodal dataset or data superset 528. A dataset sampler 530 may be used to sample the data. The data may be split into training data 532 and validation data 542. The training data 532 may include a multimodal subset training dataset 534, which may be modified using one or more of a training augmentor 536, a training transformer 538, or a training target generator 540. Similarly, the validation data 542 may include a multimodal subset validation dataset 544, which may be modified using one or more of a validation augmentor 546, a validation transformer 548, or a validation target generator 550.

The generation of the multimodal dataset or data superset 528 may include application of one or more cross-dataset operations to create joint datasets or resampled data subsets. The dataset sampler 530 may include a multimodal subset operation to define a subset of the multimodal dataset or data superset 528. In an example, the multimodal subset operation includes sampling the dataset to create the multimodal subset training dataset 534 and the multimodal subset validation dataset 544, and augmentors 536 and 546, transformers 538 and 548, and target generators 540 and 550 are applied to each data subset.

The generation of the multimodal data superset 528 may include application of a multimodal superset operation to combine multiple multimodal datasets into a single multimodal superset. This multimodal superset may be used to improve cross-dataset analysis and evaluation. This multimodal superset may also be sampled to generate one or more subsets, such as to create a dataset specific to a region (e.g., USA, Europe). The generation of the multimodal data superset 528 may include application of a dataset sampler operation to iterate over multiple dataframes within a dataset to generate a descriptor for one or more dataframes. This descriptor may be used to improve balance in a dataset, such as by generating one or more balanced subsets. In an example, the descriptor characterize a distribution of a detected object count (e.g., number of cars, number of pedestrians) within a source dataset, and the descriptor may be used to generate a training data subset and a validation data subset that each reflect the same distribution of detected object counts as in the source dataset.

Training data preparation 552 may be used to prepare each dataframe 554. In an example, an augmentor is applied to each dataframe 554 to generate an augmented dataframe 556, a transformer is applied to generate model inputs 558, and a target generator is applied to generate learning targets 560.

Figure 6:
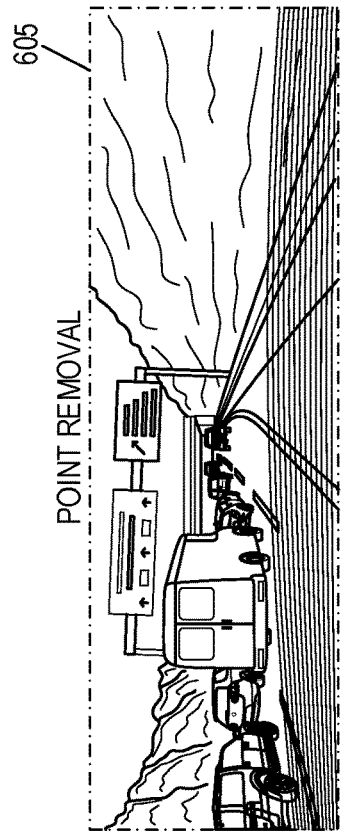
FIG. 6 is a pictorial drawing illustrating a perception sensor obfuscation, according to an embodiment.
Figure 6:
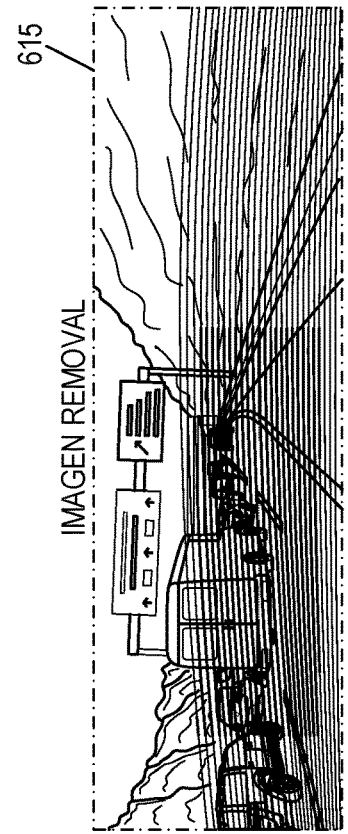
Figure 6:
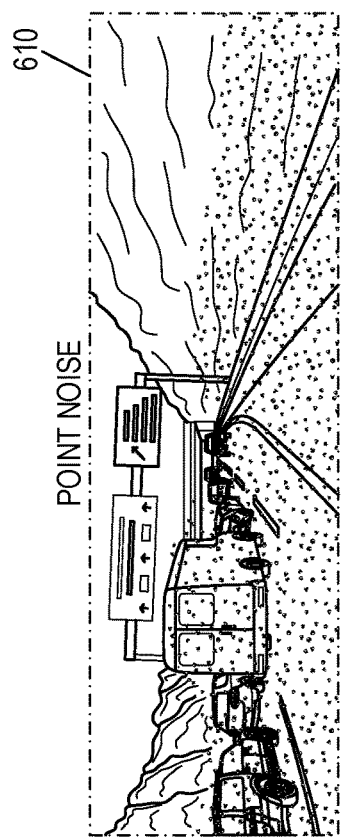
Figure 6:
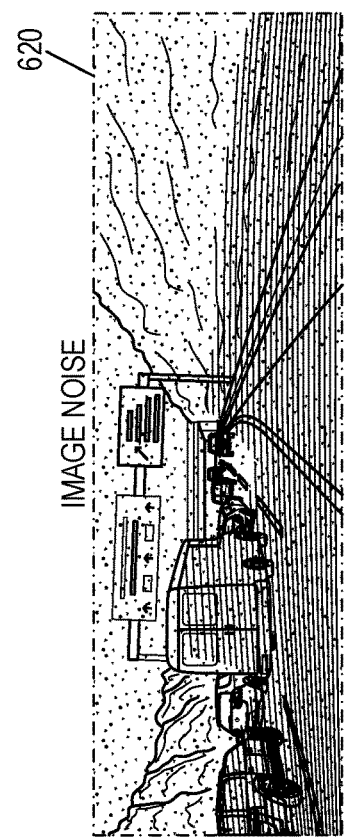

FIG. 6 is a pictorial drawing illustrating a perception sensor obfuscation 600, according to an embodiment. In addition to input dataset cropping and resizing transformations matched with ground truth labels, perception sensor obfuscation 600 may be used to obfuscate the input signal by adding noise to an image or LiDAR point cloud (e.g., ranging dataset). FIG. 6 depicts a scene captured by a LiDAR point cloud and an image capture device, where the calibrated captured image and point cloud are extracted from a multimodal dataset and calibrated, overlapped, and output to provide an image of a common scene area. A LiDAR region occlusion is shown in point cloud removal output 605, which shows a removal of points from the source LiDAR point cloud in a LiDAR range scanning region. An image region occlusion is shown in image removal output 615, which shows a masking of pixels from the source image in one or more regions. A LiDAR noise occlusion is shown in point cloud noise output 610, which shows an injection of noise (e.g., Gaussian noise) into the source LiDAR point cloud in a LiDAR range scanning region. An image region occlusion is shown in image noise output 620, which shows an injection of noise into the source image in one or more regions.

Figure 7:
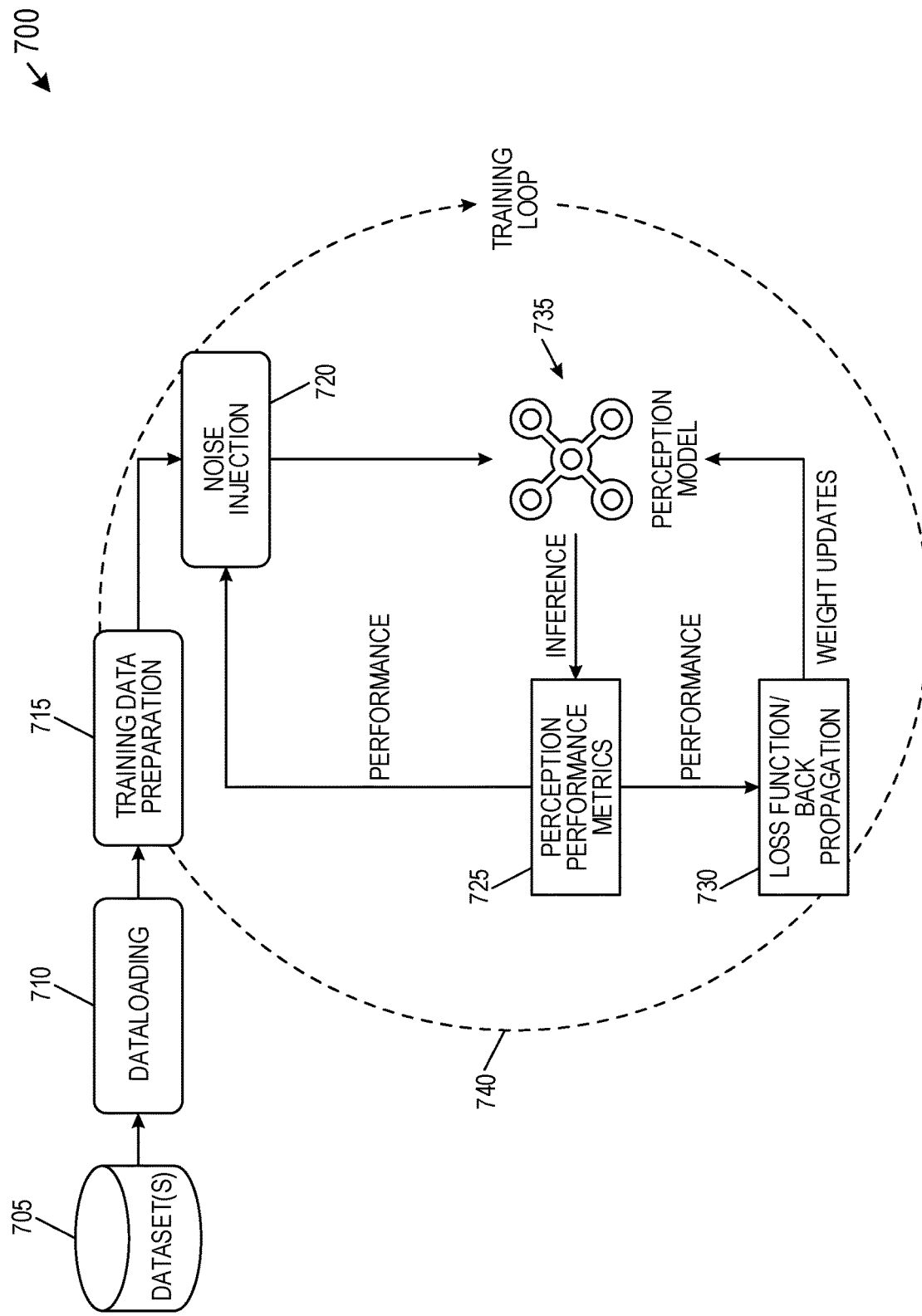
FIG. 7 is a flowchart illustrating a noise injection training environment, according to an embodiment.

FIG. 7 is a flowchart illustrating a noise injection training environment 700, according to an embodiment. The training environment 700 shows the noise injection process as part of the training loop 740 of the perception algorithm. One or more datasets 705 may be loaded by data loading module 710. These input datasets may be split, augmented, or transformed in training data preparation 715 to generate a training dataset. Noise injection 720 may apply one or more of a region occlusion or noise occlusion to the training dataset. This noise-injected dataset may be used within the perception model 735 to detect one or more objects, regions of interest, or other detected features within the dataset. The perception model 735 generates an inference output that is used to determine perception performance metrics 725. These metrics are used in loss function back-propagation 730 to generate weight updates that are used within the perception model 735 on subsequent epochs. The performance metrics may also be used by noise injection 720 to modify the type, magnitude, area, or other characteristics of the injected noise.

Noise injection 720 may include application of data occlusion, which may receive input region ranges (e.g., region minimum, region maximum) that define lower and upper bounds of an area to be occluded on the dataset sensor field. Placement of occlusions may be randomized or guided by a user-defined function. The use of user-defined occlusions may be used to place the obfuscation on critical areas, such as a driving path of the vehicle or near an area of a particular object to be detected. The center location of the bounding boxes of ground truth data labels may be used to bias automatic occlusion generation, such as for generating region occlusions or injected noise.

Noise injection 720 may include application of data noise, which may be used to define a type of noise to be used and noise type configuration parameters. In an example, the noise type may include Gaussian noise and may take parameters including mean and standard deviation. In another example, the noise type may include Perlin noise and may take parameters including octaves and seed. In yet another example, the noise type may include open simplex noise and may take parameters including seed and dimensions.

Noise injection 720 may include application of a dataset sampler to provide temporal noise injection. The effect of noise on an input perception dataset depends on the quality and quantity of noise (e.g., Gaussian noise in a specified region), but also on the temporal duration of the noise. Noise injection 720 may be used to define when to inject noise within a scene and a duration for noise injection, which may be used to improve the performance of perception models in the presence of sporadic or constant noise artifacts. A dataset sampler may provide temporal balancing of noise injection, which may include one or more of a sequential dataset sampler, a sequential subset sampler, and a temporal noise generator sampler. This dataset sampler may provide improved control over sequential order of temporal perception data, and may be used to improve balance and portioning of training data for the model and determination of the temporal aspects of the noise injection.

The dataset sampler used by noise injection 720 may include application of a sequential dataset sampler, which may be used to organize selected input data in a sequential manner. This sequential dataset sampler may be used to provide ordered scenes across one or multiple datasets. The sequential dataset sampler may generate an ordered dictionary of scenes, where each scene includes a sequence of consecutive frames in a common location. A dataset dictionary may be used to provide an automatic mapping between datasets to minimize or eliminate repeated timestamp sequences.

The dataset sampler used by noise injection 720 may include application of a sequential subset sampler, which may be used to determine a subset of data based on provided attributes. This sequential subset sampler may be used to sample a set of scenes and generate a data subset using only scenes with an associated minimum length (e.g., minimum number of seconds, minimum number of frames) or using only scenes with certain environmental conditions (e.g., rain, fog, snow) indicated within dataframe metadata. In an example, scenes may be selected based on whether they include sequences with specified road actors (e.g., pedestrians, bicyclists), whether they include vegetation (e.g., trees, bushes, grass), or whether they include a particular type of weather (e.g., rainy, cloudy, cloudless). This sequential subset sampler may receive an ordered dictionary (e.g., an output of sequential dataset sampler) and the subset features identified by keyword and value (e.g., as a tuple data type), and may generate a subset of sequences matching some or all of the identified subset features.

The dataset sampler used by noise injection 720 may include application of a temporal noise generator sampler, which may be used to control the temporal characteristics of the noise injection on a selected training dataset scene. The temporal noise generator sampler may be used to define an approach for application of a particular type of noise as random, balanced, constant, or guided. The random noise approach randomly determines a start and duration of the noise injection in the scene. The balanced noise approach takes into consideration the varying lengths of each scene, and injects a substantially consistent magnitude of noise across the different scenes at different time segments (e.g., beginning, middle, end). The constant noise approach is a simpler approach that may follow user rules to inject noise for a determined duration and position across all training scenes. The guided noise approach allows for a user-specified loss function, which may be used within loss function back propagation 720 within the training loop 740. User-specified performance metrics may be used by data occlusion used within noise injection 720. Depending on a selected machine learning method or architecture, the noise injection 720 may also be integrated into the design of the loss function loss function back propagation 720, such as may be used in Reinforcement Learning or Adversarial Machine Learning.

Figure 8:
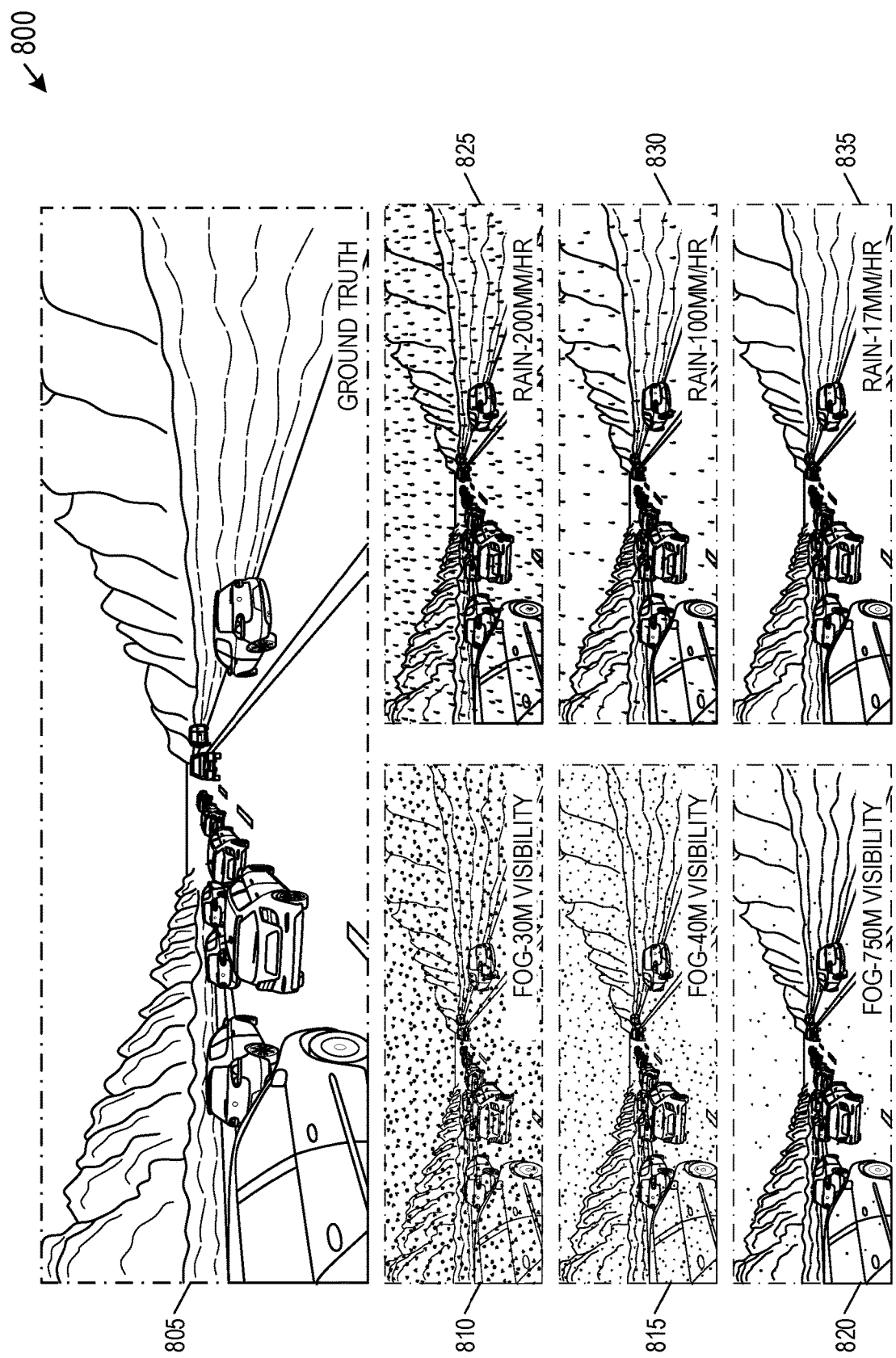
FIG. 8 is a pictorial drawing illustrating multimodal perception sensor synthetic adverse weather, according to an embodiment.

FIG. 8 is a pictorial drawing illustrating multimodal perception sensor synthetic adverse weather 800, according to an embodiment. Sensor noise may be used to generate synthetic adverse weather or atmospheric conditions, which may be used to improve the performance of a perception model under real-world adverse weather or atmospheric conditions. The synthetic adverse weather 800 may include a ground truth 805 associated with data gathered on a cloudless day. A synthetic fog may be applied to ground truth 805, such as to generate fog with 30-meter visibility 810, fog with 40-meter visibility 815, or fog with 750-meter visibility 820. Similarly, a synthetic rain may be applied to ground truth 805, such as to generate 20-millimeter per hour (mm/hr) rain 825, 100 mm/hr rain 830, or 17 mm/hr rain 835.

The synthetic weather or atmospheric conditions may include a multimodal cross-dataset analysis to simulate diverse types of synthetic adverse weather or atmospheric conditions such as rain, fog, snow, and night conditions. The multimodal cross-dataset analysis may be used to improve a selection of training data for use during training. In an example, one or more datasets that include real-world rain events may be selected, and one or more additional datasets without real-world rain events may be selected and augmented to generate corresponding rain datasets, such as rain events shown in FIG. 8. This multimodal cross-dataset analysis may include creating a joint dataset and then use a dataset sampler to generate balanced data subsets according to the weather conditions in each data frame.

Figure 9:
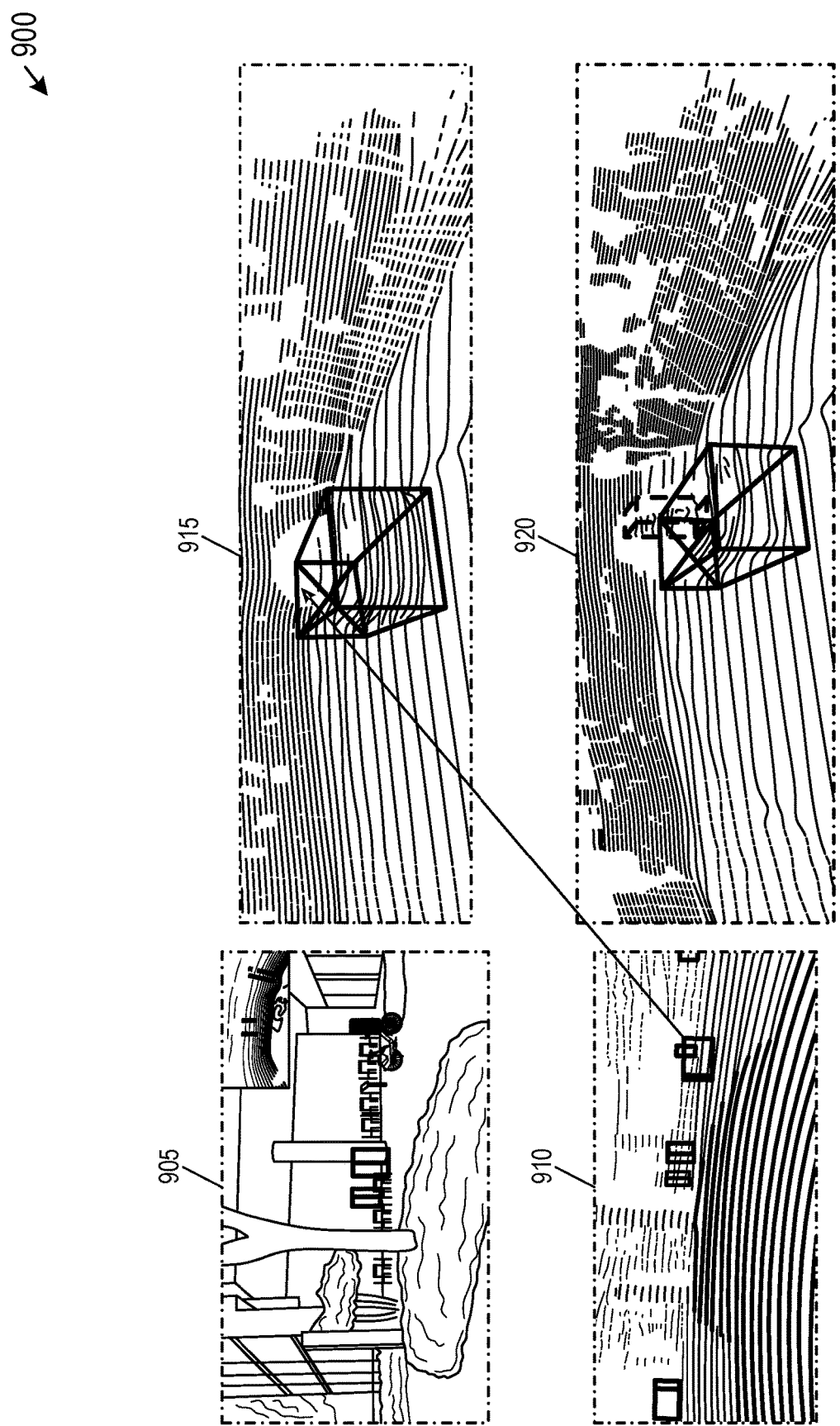
FIG. 9 is a pictorial drawing illustrating cross-dataset 3D object insertion, according to an embodiment.

FIG. 9 is a pictorial drawing illustrating cross-dataset 3D object insertion 900, according to an embodiment. In addition to image augmentation, cross-dataset 3D object insertion 900 may be used to extract object samples from cross-datasets and injecting them into frames of other datasets to improve accuracy. In an example, a captured image 910 may include a bicycle 915. As shown in extracted feature point cloud 920, the bicycle may be identified by a bounding box 925. The captured images and point-clouds associated with bicycles in various datasets may be stored in a database and a lookup table, which may be used for augmentation in other datasets. As shown in point cloud 930, a vehicle may be identified by a bounding rectangular area 935. The bicycle from bounding box 925 may be used to augment the point cloud 930 by placing the bicycle on top of the vehicle bounding rectangular area 935, and may be used to generate augmented point cloud 940 with augmented bicycle 945. Orientation information may be saved for each object sample to make a more realistic insertion, such as by rotating bicycle 915 to be parallel with the longest dimension of vehicle bounding rectangular area 935. Data from various bicycles may be used to improve training and model performance, such as using captured images or point-clouds associated with a first bicycle in a first set of training dataframes, then using captured images or point-clouds associated with other bicycles in subsequent training dataframes.

Figure 10:
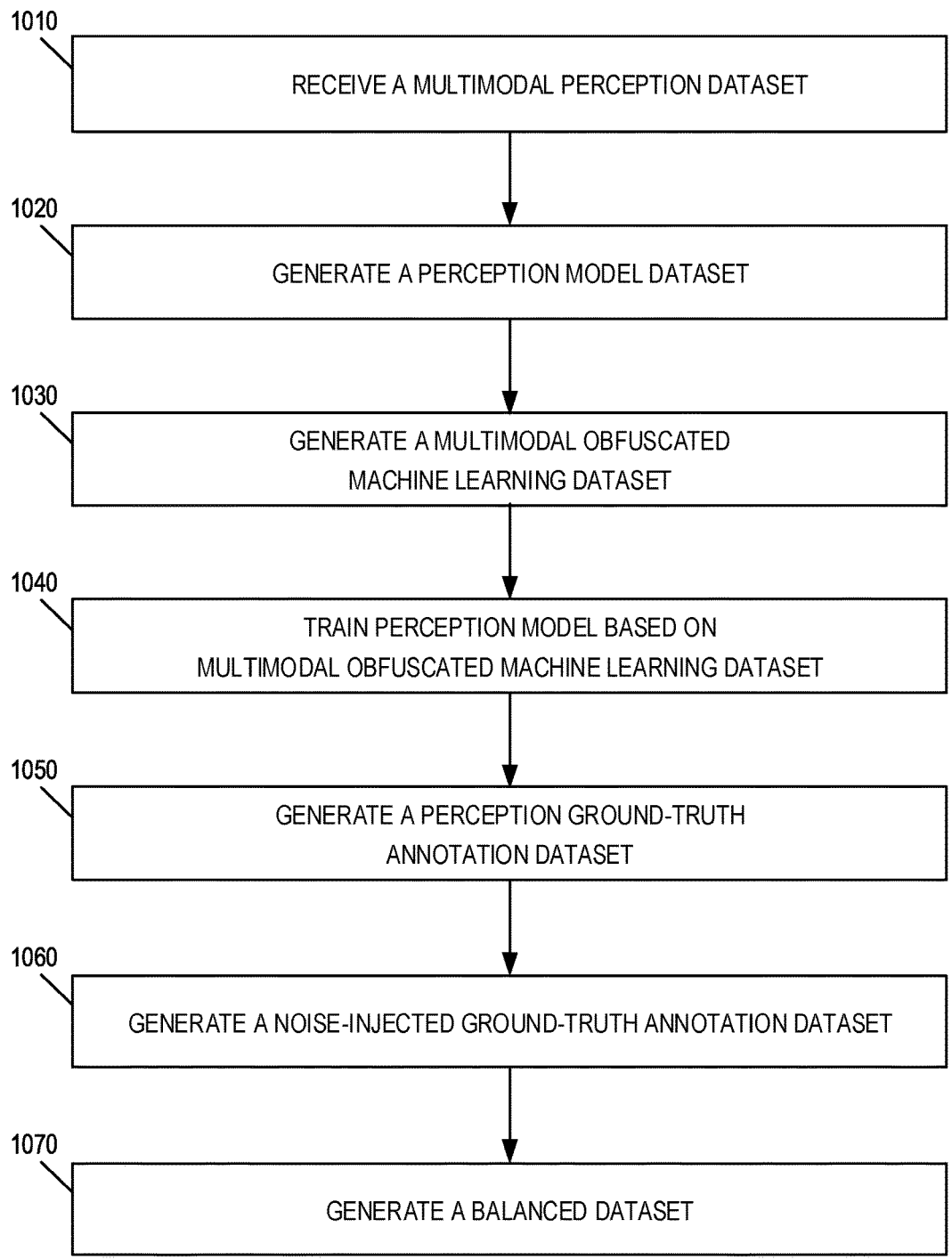
FIG. 10 is a schematic drawing illustrating a method, according to an embodiment.

FIG. 10 is a schematic drawing illustrating a method 1000, according to an embodiment. Method 1000 includes receiving 1010 a multimodal perception dataset. The multimodal perception dataset may include an image dataset captured by an image capture device and a ranging dataset captured by a ranging sensor device. Method 1000 includes generating 1020 a perception model dataset based on the multimodal perception dataset and based on a target perception model. The perception model dataset may match a target perception model input type and a target perception model shape. Method 1000 includes generating 1030 a multimodal obfuscated machine learning dataset based on the perception model dataset. The multimodal obfuscated machine learning dataset including a sensor noise injection for both the image dataset and the ranging dataset. The sensor noise injection may include a sensor signal noise injection, a temporal noise injection, and a multimodal adverse weather sensor injection. The multimodal adverse weather sensor injection may include at least one of a night noise injection, a rain noise injection, a fog noise injection, and a snow noise injection. Method 1000 includes training a perception model based on the generated multimodal obfuscated machine learning dataset.

The generation 1020 of the perception model dataset may be further based on a sensor signal augmentation to augment the perception model dataset to match the target perception model input type and the target perception model shape. The sensor signal augmentation may include at least one of a crop augmentation, a resize augmentation, and a crop-resize augmentation. The sensor signal augmentation may include a data set transformer to map the multimodal perception dataset to a plurality of target model input tensors. The generation 1020 of the perception model dataset may be further based on a cross-dataset manipulation. The cross-dataset manipulation may include at least one of a multimodal subset, a multimodal superset, and a dataset sampler.

Method 1000 may include generating 1050 a perception ground-truth annotation dataset based on the target perception model input type and the target perception model shape. The perception ground-truth annotation dataset may be used to transform a plurality of ground-truth annotations to maintain compatibility with the perception model dataset. Method 1000 may include generating 1060 a noise-injected ground-truth annotation dataset based on the perception ground-truth annotation dataset and the sensor noise injection. The noise-injected ground-truth annotation dataset may identify a sensor noise annotation associated with the sensor noise injection. Method 1000 may include generating 1070 a balanced dataset based on the multimodal perception dataset. The balanced dataset may include a substantially balanced number of samples in each of the image dataset and the ranging dataset.

Figure 11:
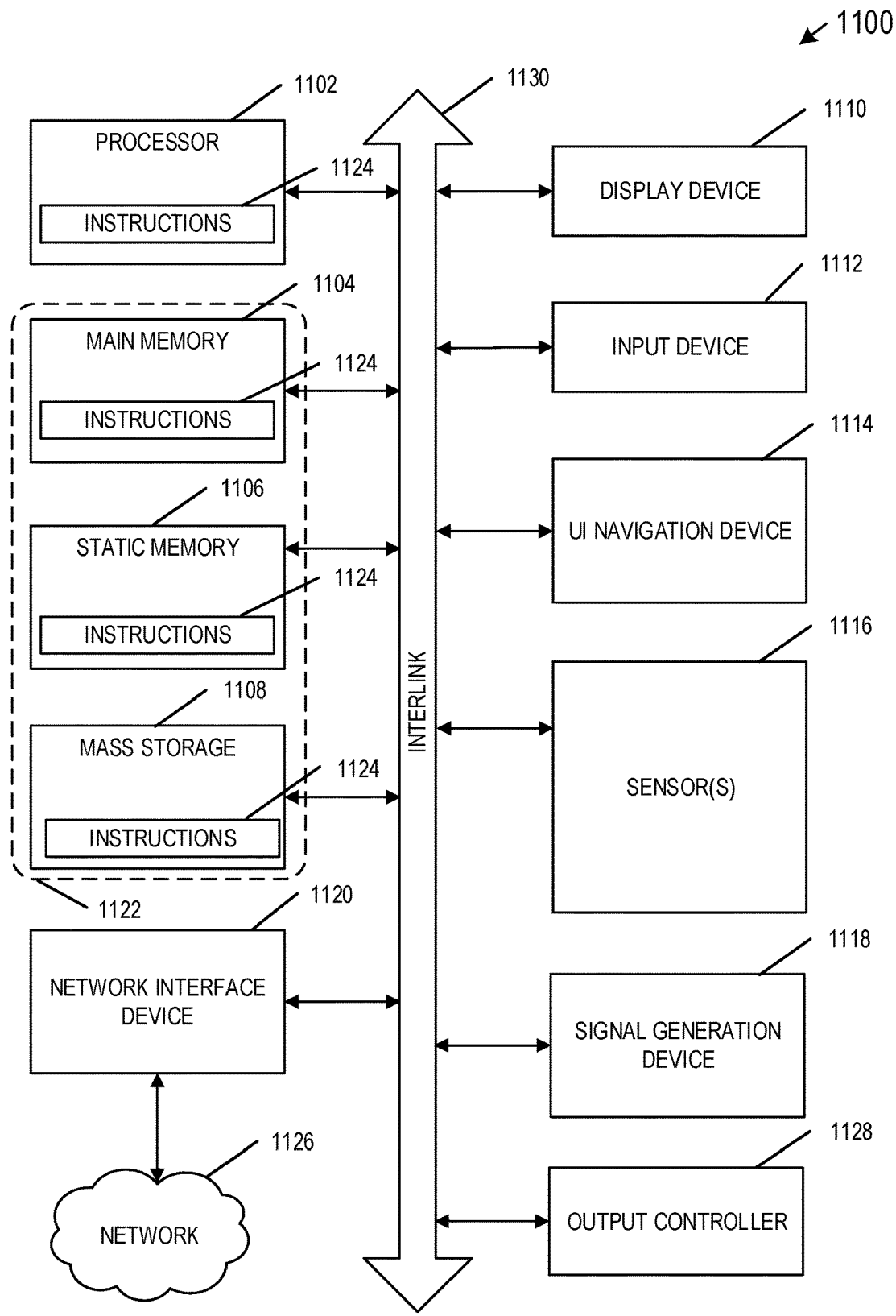
FIG. 11 is a block diagram illustrating a machine in the example form of a computer system, within which a set or sequence of instructions may be executed to cause the machine to perform any one of the methodologies discussed herein, according to an embodiment.

FIG. 11 is a block diagram illustrating a machine in the example form of a computer system 1100, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may function as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus). The computer system 1100 may further include a video display unit 1110, an alphanumeric input device 1112 (e.g., a keyboard), and a user interface (UI) navigation device 1114 (e.g., a mouse). In one embodiment, the video display unit 1110, input device 1112 and UI navigation device 1114 are incorporated into a touch screen display. The computer system 1100 may additionally include a storage device 1116 (e.g., a drive unit), a signal generation device 1118 (e.g., a speaker), a network interface device 1120, and one or more sensors (not shown), such as a global positioning system (GPS) sensor, compass, accelerometer, gyroscope sensor, inertial sensor, magnetometer, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, such as semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 using well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or satellite communication networks). The term "transmission medium" shall be taken to include any intangible medium that is capable of storing, encoding, or carrying instructions for execution by the machine, and includes digital or analog communications signals or other intangible medium to facilitate communication of such software.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Example 1 is a system for autonomous vehicle perception development and training, the system comprising: processing circuitry; and a memory that includes, instructions, the instructions, when executed by the processing circuitry, cause the processor circuitry to: receive a multimodal perception dataset, the multimodal perception dataset including an image dataset captured by an image capture device and a ranging dataset captured by a ranging sensor device; generate a perception model dataset based on the multimodal perception dataset, the perception model dataset matching a plurality of target perception model parameters of a target perception model; generate a multimodal obfuscated machine learning dataset based on the perception model dataset, the multimodal obfuscated machine learning dataset including a sensor noise injection for both the image dataset and the ranging dataset; and train a perception model based on the multimodal obfuscated machine learning dataset.

In Example 2, the subject matter of Example 1 includes, wherein the sensor noise injection includes at least one of a sensor signal noise injection, a temporal noise injection, an adverse light condition injection, or a multimodal adverse weather sensor injection.

In Example 3, the subject matter of Example 2 includes, wherein the adverse light condition injection includes at least one of a night lighting injection, a glare injection, or a reflection injection.

In Example 4, the subject matter of Examples 2-3 includes, wherein the multimodal adverse weather sensor injection includes at least one of a night noise injection, a rain noise injection, a fog noise injection, or a snow noise injection.

In Example 5, the subject matter of Examples 1~4 includes, wherein the generation of the perception model dataset is further based on a sensor signal augmentation to augment the perception model dataset to match the plurality of target perception model parameters.

In Example 6, the subject matter of Example 5 includes, wherein the sensor signal augmentation includes at least one of a crop augmentation, a resize augmentation, or a crop-resize augmentation.

In Example 7, the subject matter of Examples 5-6 includes, wherein the sensor signal augmentation includes a dataset transformation to map the multimodal perception dataset to a plurality of target model input tensors.

In Example 8, the subject matter of Examples 1-7 includes, wherein the generation of the perception model dataset is further based on a cross-dataset operation.

In Example 9, the subject matter of Example 8 includes, wherein the cross-dataset manipulation includes at least one of a multimodal subset, a multimodal superset, or a dataset sampler.

In Example 10, the subject matter of Examples 1-9 includes, the instructions further causing the processing circuitry to generate a perception ground-truth annotation dataset based on the plurality of target perception model parameters, the perception ground-truth annotation dataset to transform a plurality of ground-truth annotations to maintain compatibility with the perception model dataset.

In Example 11, the subject matter of Example 10 includes, the instructions further causing the processing circuitry to generate a noise-injected ground-truth annotation dataset based on the perception ground-truth annotation dataset and the sensor noise injection, the noise-injected ground-truth annotation dataset identifying a sensor noise annotation associated with the sensor noise injection.

In Example 12, the subject matter of Examples 1-11 includes, the instructions further causing the processing circuitry to generate a balanced dataset based on the multimodal perception dataset, the balanced dataset including a substantially balanced number of samples in each of a plurality of multimodal perception data subsets generated based on the multimodal perception dataset.

Example 13 is at least one non-transitory machine-readable storage medium, comprising a plurality of instructions that, responsive to being executed with processor circuitry of a computer-controlled device, cause the processor circuitry to: receive a multimodal perception dataset, the multimodal perception dataset including an image dataset captured by an image capture device and a ranging dataset captured by a ranging sensor device; generate a perception model dataset based on the multimodal perception dataset, the perception model dataset matching a plurality of target perception model parameters of a target perception model; generate a multimodal obfuscated machine learning dataset based on the perception model dataset, the multimodal obfuscated machine learning dataset including a sensor noise injection for both the image dataset and the ranging dataset; and train a perception model based on the multimodal obfuscated machine learning dataset.

In Example 14, the subject matter of Example 13 includes, wherein the sensor noise injection includes at least one of a sensor signal noise injection, a temporal noise injection, an adverse light condition injection, or a multimodal adverse weather sensor injection.

In Example 15, the subject matter of Example 14 includes, wherein the adverse light condition injection includes at least one of a night lighting injection, a glare injection, or a reflection injection.

In Example 16, the subject matter of Examples 14-15 includes, wherein the multimodal adverse weather sensor injection includes at least one of a night noise injection, a rain noise injection, a fog noise injection, or a snow noise injection.

In Example 17, the subject matter of Examples 13-16 includes, wherein the generation of the perception model dataset is further based on a sensor signal augmentation to augment the perception model dataset to match the plurality of target perception model parameters.

In Example 18, the subject matter of Example 17 includes, wherein the sensor signal augmentation includes at least one of a crop augmentation, a resize augmentation, or a crop-resize augmentation.

In Example 19, the subject matter of Examples 17-18 includes, wherein the sensor signal augmentation includes a dataset transformation to map the multimodal perception dataset to a plurality of target model input tensors.

In Example 20, the subject matter of Examples 13-19 includes, wherein the generation of the perception model dataset is further based on a cross-dataset operation.

In Example 21, the subject matter of Example 20 includes, wherein the cross-dataset manipulation includes at least one of a multimodal subset, a multimodal superset, or a dataset sampler.

In Example 22, the subject matter of Examples 13-21 includes, the instructions further causing the processing circuitry to generate a perception ground-truth annotation dataset based on the plurality of target perception model parameters, the perception ground-truth annotation dataset to transform a plurality of ground-truth annotations to maintain compatibility with the perception model dataset.

In Example 23, the subject matter of Example 22 includes, the instructions further causing the processing circuitry to generate a noise-injected ground-truth annotation dataset based on the perception ground-truth annotation dataset and the sensor noise injection, the noise-injected ground-truth annotation dataset identifying a sensor noise annotation associated with the sensor noise injection.

In Example 24, the subject matter of Examples 13-23 includes, the instructions further causing the processing circuitry to generate a balanced dataset based on the multimodal perception dataset, the balanced dataset including a substantially balanced number of samples in each of a plurality of multimodal perception data subsets generated based on the multimodal perception dataset.

Example 25 is a method for autonomous vehicle perception development and training, the method comprising: receiving a multimodal perception dataset, the multimodal perception dataset including an image dataset captured by an image capture device and a ranging dataset captured by a ranging sensor device; generating a perception model dataset based on the multimodal perception dataset, the perception model dataset matching a plurality of target perception model parameters of a target perception model; generating a multimodal obfuscated machine learning dataset based on the perception model dataset, the multimodal obfuscated machine learning dataset including a sensor noise injection for both the image dataset and the ranging dataset; training a perception model based on the multimodal obfuscated machine learning dataset.

In Example 26, the subject matter of Example 25 includes, wherein the sensor noise injection includes at least one of a sensor signal noise injection, a temporal noise injection, an adverse light condition injection, or a multimodal adverse weather sensor injection.

In Example 27, the subject matter of Example 26 includes, wherein the adverse light condition injection includes at least one of a night lighting injection, a glare injection, or a reflection injection.

In Example 28, the subject matter of Examples 26-27 includes, wherein the multimodal adverse weather sensor injection includes at least one of a night noise injection, a rain noise injection, a fog noise injection, or a snow noise injection.

In Example 29, the subject matter of Examples 25-28 includes, wherein the generation of the perception model dataset is further based on a sensor signal augmentation to augment the perception model dataset to match the plurality of target perception model parameters.

In Example 30, the subject matter of Example 29 includes, wherein the sensor signal augmentation includes at least one of a crop augmentation, a resize augmentation, or a crop-resize augmentation.

In Example 31, the subject matter of Examples 29-30 includes, wherein the sensor signal augmentation includes a dataset transformation to map the multimodal perception dataset to a plurality of target model input tensors.

In Example 32, the subject matter of Examples 25-31 includes, wherein the generation of the perception model dataset is further based on a cross-dataset operation.

In Example 33, the subject matter of Example 32 includes, wherein the cross-dataset manipulation includes at least one of a multimodal subset, a multimodal superset, or a dataset sampler.

In Example 34, the subject matter of Examples 25-33 includes, generating a perception ground-truth annotation dataset based on the plurality of target perception model parameters, the perception ground-truth annotation dataset to transform a plurality of ground-truth annotations to maintain compatibility with the perception model dataset.

In Example 35, the subject matter of Example 34 includes, generating a noise-injected ground-truth annotation dataset based on the perception ground-truth annotation dataset and the sensor noise injection, the noise-injected ground-truth annotation dataset identifying a sensor noise annotation associated with the sensor noise injection.

In Example 36, the subject matter of Examples 25-35 includes, generating a balanced dataset based on the multimodal perception dataset, the balanced dataset including a substantially balanced number of samples in each of a plurality of multimodal perception data subsets generated based on the multimodal perception dataset.

Example 37 is an apparatus for autonomous vehicle perception development and training, the apparatus comprising: means for receiving a multimodal perception dataset, the multimodal perception dataset including an image dataset captured by an image capture device and a ranging dataset captured by a ranging sensor device; means for generating a perception model dataset based on the multimodal perception dataset, the perception model dataset matching a plurality of target perception model parameters of a target perception model; means for generating a multimodal obfuscated machine learning dataset based on the perception model dataset, the multimodal obfuscated machine learning dataset including a sensor noise injection for both the image dataset and the ranging dataset; means for training a perception model based on the multimodal obfuscated machine learning dataset.

In Example 38, the subject matter of Example 37 includes, wherein the sensor noise injection includes at least one of a sensor signal noise injection, a temporal noise injection, an adverse light condition injection, or a multimodal adverse weather sensor injection.

In Example 39, the subject matter of Example 38 includes, wherein the adverse light condition injection includes at least one of a night lighting injection, a glare injection, or a reflection injection.

In Example 40, the subject matter of Examples 38-39 includes, wherein the multimodal adverse weather sensor injection includes at least one of a night noise injection, a rain noise injection, a fog noise injection, or a snow noise injection.

In Example 41, the subject matter of Examples 37-40 includes, wherein the generation of the perception model dataset is further based on a sensor signal augmentation to augment the perception model dataset to match the plurality of target perception model parameters.

In Example 42, the subject matter of Example 41 includes, wherein the sensor signal augmentation includes at least one of a crop augmentation, a resize augmentation, or a crop-resize augmentation.

In Example 43, the subject matter of Examples 41-42 includes, wherein the sensor signal augmentation includes a dataset transformation to map the multimodal perception dataset to a plurality of target model input tensors.

In Example 44, the subject matter of Examples 37-43 includes, wherein the generation of the perception model dataset is further based on a cross-dataset operation.

In Example 45, the subject matter of Example 44 includes, wherein the cross-dataset manipulation includes at least one of a multimodal subset, a multimodal superset, or a dataset sampler.

In Example 46, the subject matter of Examples 37-45 includes, means for generating a perception ground-truth annotation dataset based on the plurality of target perception model parameters, the perception ground-truth annotation dataset to transform a plurality of ground-truth annotations to maintain compatibility with the perception model dataset.

In Example 47, the subject matter of Example 46 includes, means for generating a noise-injected ground-truth annotation dataset based on the perception ground-truth annotation dataset and the sensor noise injection, the noise-injected ground-truth annotation dataset identifying a sensor noise annotation associated with the sensor noise injection.

In Example 48, the subject matter of Examples 37-47 includes, means for generating a balanced dataset based on the multimodal perception dataset, the balanced dataset including a substantially balanced number of samples in each of a plurality of multimodal perception data subsets generated based on the multimodal perception dataset.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for autonomous vehicle perception development and training, the system comprising:
    processing circuitry; and
    a memory that includes instructions, the instructions, when executed by the processing circuitry, cause the processor circuitry to:
        receive a multimodal perception dataset, the multimodal perception dataset including an image dataset captured by an image capture device and a ranging dataset captured by a ranging sensor device;
        generate a perception model dataset based on the multimodal perception dataset, the perception model dataset matching a plurality of target perception model parameters of a target perception model;
        generate a multimodal obfuscated machine learning dataset based on the perception model dataset, the multimodal obfuscated machine learning dataset including a sensor noise injection for both the image dataset and the ranging dataset; and
        train a perception model based on the multimodal obfuscated machine learning dataset.

2. The system of claim 1, wherein the sensor noise injection includes at least one of a sensor signal noise injection, a temporal noise injection, an adverse light condition injection, or a multimodal adverse weather sensor injection.

3. The system of claim 2, wherein the adverse light condition injection includes at least one of a night lighting injection, a glare injection, or a reflection injection.

4. The system of claim 2, wherein the multimodal adverse weather sensor injection includes at least one of a night noise injection, a rain noise injection, a fog noise injection, or a snow noise injection.

5. The system of claim 1, wherein the generation of the perception model dataset is further based on a sensor signal augmentation to augment the perception model dataset to match the plurality of target perception model parameters.

6. The system of claim 5, wherein the sensor signal augmentation includes at least one of a crop augmentation, a resize augmentation, or a crop-resize augmentation.

7. The system of claim 5, wherein the sensor signal augmentation includes a dataset transformation to map the multimodal perception dataset to a plurality of target model input tensors.

8. The system of claim 1, wherein the generation of the perception model dataset is further based on a cross-dataset operation.

9. The system of claim 8, wherein the cross-dataset manipulation includes at least one of a multimodal subset, a multimodal superset, or a dataset sampler.

10. The system of claim 1, the instructions further causing the processing circuitry to generate a perception ground-truth annotation dataset based on the plurality of target perception model parameters, the perception ground-truth annotation dataset to transform a plurality of ground-truth annotations to maintain compatibility with the perception model dataset.

11. The system of claim 1, the instructions further causing the processing circuitry to generate a balanced dataset based on the multimodal perception dataset, the balanced dataset including a substantially balanced number of samples in each of a plurality of multimodal perception data subsets generated based on the multimodal perception dataset.

12. At least one non-transitory machine-readable storage medium, comprising a plurality of instructions that, responsive to being executed with processor circuitry of a computer-controlled device, cause the processor circuitry to:
receive a multimodal perception dataset, the multimodal perception dataset including an image dataset captured by an image capture device and a ranging dataset captured by a ranging sensor device;
generate a perception model dataset based on the multimodal perception dataset, the perception model dataset matching a plurality of target perception model parameters of a target perception model;
generate a multimodal obfuscated machine learning dataset based on the perception model dataset, the multimodal obfuscated machine learning dataset including a sensor noise injection for both the image dataset and the ranging dataset; and
train a perception model based on the multimodal obfuscated machine learning dataset.

13. The non-transitory machine-readable storage medium of claim 12, wherein the sensor noise injection includes at least one of a sensor signal noise injection, a temporal noise injection, an adverse light condition injection, or a multimodal adverse weather sensor injection.

14. The non-transitory machine-readable storage medium of claim 13, wherein the adverse light condition injection includes at least one of a night lighting injection, a glare injection, or a reflection injection.

15. The non-transitory machine-readable storage medium of claim 13, wherein the multimodal adverse weather sensor injection includes at least one of a night noise injection, a rain noise injection, a fog noise injection, or a snow noise injection.

16. The non-transitory machine-readable storage medium of claim 12, wherein the generation of the perception model dataset is further based on a sensor signal augmentation to augment the perception model dataset to match the plurality of target perception model parameters.

17. The non-transitory machine-readable storage medium of claim 16, wherein the sensor signal augmentation includes at least one of a crop augmentation, a resize augmentation, or a crop-resize augmentation.

18. The non-transitory machine-readable storage medium of claim 16, wherein the sensor signal augmentation includes a dataset transformation to map the multimodal perception dataset to a plurality of target model input tensors.

19. The non-transitory machine-readable storage medium of claim 12, wherein the generation of the perception model dataset is further based on a cross-dataset operation.

20. The non-transitory machine-readable storage medium of claim 19, wherein the cross-dataset manipulation includes at least one of a multimodal subset, a multimodal superset, or a dataset sampler.

21. The non-transitory machine-readable storage medium of claim 12, the instructions further causing the processing circuitry to generate a perception ground-truth annotation dataset based on the plurality of target perception model parameters, the perception ground-truth annotation dataset to transform a plurality of ground-truth annotations to maintain compatibility with the perception model dataset.

22. The non-transitory machine-readable storage medium of claim 12, the instructions further causing the processing circuitry to generate a balanced dataset based on the multimodal perception dataset, the balanced dataset including a substantially balanced number of samples in each of a plurality of multimodal perception data subsets generated based on the multimodal perception dataset.

23. An apparatus for autonomous vehicle perception development and training, the apparatus comprising:
means for receiving a multimodal perception dataset, the multimodal perception dataset including an image dataset captured by an image capture device and a ranging dataset captured by a ranging sensor device;
means for generating a perception model dataset based on the multimodal perception dataset, the perception model dataset matching a plurality of target perception model parameters of a target perception model;
means for generating a multimodal obfuscated machine learning dataset based on the perception model dataset, the multimodal obfuscated machine learning dataset including a sensor noise injection for both the image dataset and the ranging dataset;
means for training a perception model based on the multimodal obfuscated machine learning dataset.

24. The apparatus of claim 23, further including means for generating a perception ground-truth annotation dataset based on the plurality of target perception model parameters, the perception ground-truth annotation dataset to transform a plurality of ground-truth annotations to maintain compatibility with the perception model dataset.

25. The apparatus of claim 23, further including means for generating a balanced dataset based on the multimodal perception dataset, the balanced dataset including a substantially balanced number of samples in each of a plurality of multimodal perception data subsets generated based on the multimodal perception dataset.

* * * * *